J. S. GORTON.
INSTRUMENT FOR DRAFTING PATTERNS FOR GARMENTS.
APPLICATION FILED MAR. 31, 1916.

1,214,296.

Patented Jan. 30, 1917.
3 SHEETS—SHEET 1.

UNITED STATES PATENT OFFICE.

JOSEPHINE S. GORTON, OF CHICAGO, ILLINOIS.

INSTRUMENT FOR DRAFTING PATTERNS FOR GARMENTS.

1,214,296.   Specification of Letters Patent.   Patented Jan. 30, 1917.

Application filed March 31, 1916. Serial No. 87,999.

*To all whom it may concern:*

Be it known that I, JOSEPHINE S. GORTON, a citizen of the United States, and resident of Chicago, in the county of Cook and State of Illinois, have invented certain new and useful Improvements in Instruments for Drafting Patterns for Garments, of which the following is a full, clear, and exact specification.

This invention relates to improvements in instruments for drafting from actual measurements, patterns with the use of a single flat instrument, provided with curved and straight edges, scales, curved and straight lines and titles therefor intended and designed in numbers and character to be sufficient for drafting patterns for practically every inner and outer garment worn by women. As heretofore constructed, such instruments consist of stiff card board, one end edge and a substantial portion of one side edge of which is curved on arcs of circles differing in diameter, merging into straight longitudinal edges, converging thence substantially to a point, for accordingly directing a pencil for drawing the lines of patterns, and are provided on their opposing surfaces with an imprinted line projecting at a right angle to the longer edge and bisecting its opposing curved edges for indicating one side of a square physically limited to the longer and graduated scaled straight edge of the instrument. On the surfaces of the drafting instruments so formed there has also heretofore been imprinted a large number of calculated scales, lines, both straight and curved, with titles correspondingly numerous therefor, necessitating the use of about seventy-five printed pages of instructions, the teaching and learning of which can at best only be, following objectionably laborious study and prolonged use of time. Moreover from practice and in teaching numerous pupils for many years, some of these scales are found to be inaccurate in calculation, and others because of their multiplicity. It is found that many of their scales may be best dispensed with, and a tape measure be substituted to better advantage both in time and labor, ease and for the purpose of accuracy; that their imprinted curved and straight lines are not only unnecessary and difficult to teach, but confusing to pupils, and are therefore best dispensed with; and finally that the necessity for using in addition to such instruments an implement separate therefrom for insuring accuracy in squaring the draft, is to say the least of it, undesirable because of the additional time required for handling two instruments, and the annoyance due to the mislaying of one or the other, which unavoidably frequently happens.

From the foregoing it will now be apparent that any means by which it is possible and practical to accurately draft patterns for substantially every garment worn by women from actual measurement, and in their entirety, with the use of but a single instrument, provided with the fewest possible number of accurately calculated scales, and imprinted straight lines in the absence of any imprinted curved lines, will be a substantial and material improvement in the pattern drafting art.

The prime object of my invention broadly stated is an instrument for drafting patterns for each and every of said garments, the form of which, the number of scales thereon and the instructions for their use, provide a means for not only teaching and learning the accurate drafting of patterns scientifically from actual measurement in the shortest time possible, and without laborious study, but which may be self taught to any one of ordinary intelligence.

A further object of my invention is to have such a drafting instrument physically provided with a "square" formed integral therewith for squaring the draft from time to time, as must be for the necessary accuracy of the pattern, and whereby the use of a separate instrument for squaring the work is dispensed with, the time and labor required for completing the draft of the pattern is correspondingly reduced, thereby making it possible and practical to draft patterns for garments with a single instrument to the exclusion of all instruments of precision or measurement other than a tape measure.

With these ends in view, my invention finds embodiment in certain features of novelty in the construction, combination and arrangement of parts by which the said objects and certain other objects are attained, all as hereinafter fully described with reference to the accompanying drawings, and more particularly pointed out in the claims.

In said drawings.

Similar characters of reference indicate the same parts in the several figures of the drawings.

Figure 1:
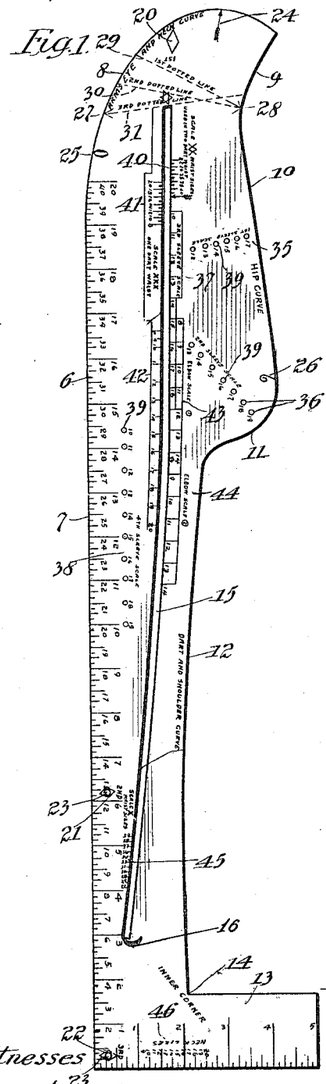
Figure 1 illustrates in elevation one side or surface of a drafting implement for garments in which my invention finds embodiment.
Figure 2:
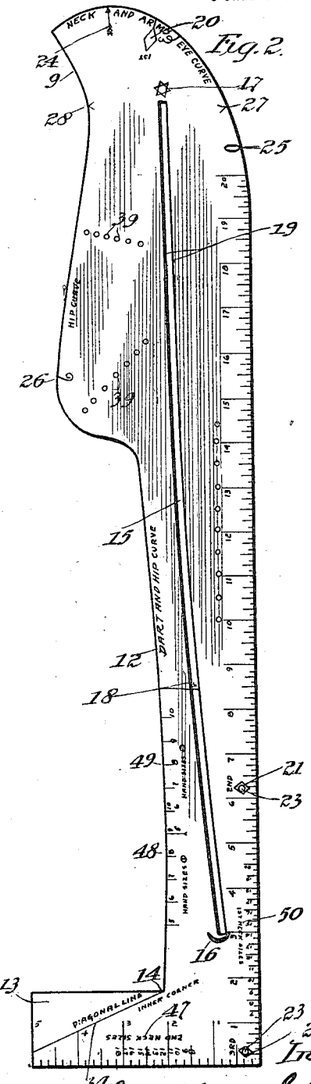
Fig. 2 is a similar view of the reverse side thereof.

The instrument of my invention may, as indicated in Figs. 1 and 2, be cut from card board, which, however, for lightness, consistent with strength and durability is preferably constructed from sheet fiber, a well known stiff and tough material produced by the chemical treatment of paper pulp, but may be formed of any material in sheet-like form, such for example as gutta percha, vulcanized rubber, celluloid or metal adapted for the purposes of my invention. The instrument of my invention when produced from any of these flat materials is so formed as to provide it with a longitudinal straight edge 6 extending substantially from end to end provided adjacent thereto with an inch scale 7 divided into half, quarter and eighth inches, which straight edge merges into a curved edge 8 extending entirely across the adjacent end of the instrument and being formed on arcs of circles differing in diameter, provides a means for directing a pencil in drawing the curved lines for a measured arm-scye and neck curve of a waist or other garment necessarily containing an arm scye and a neck curve.

Curved edge 8 intersects an inwardly curved edge 9 merging into a slightly outwardly curved edge for a "hip curve" 10, the general direction of which is slightly oblique with reference to the line of the straight edge 6 for directing a pencil for drawing the hip curve for any garment requiring to be fitted to the form of the hips of the wearer. The edge 10 terminates in an abrupt inwardly curved edge 11 connecting the edge 10 with an edge 12 extending thence for nearly one-half the length of the instrument to the inner edge of the short arm 13 of a square, the outer edge of the long arm of which is formed by the straight edge 6, the curved edge 12 providing a means for directing a pencil for drawing the curved shoulder and under arm lines.

A square is formed by the intersection of the long curved edge 12 with the inner edge of the short arm 13 and provides the "inner corner" 14, which is so indicated upon both sides of the instrument for the purpose hereinafter described.

Extending lengthwise of the instrument is a somewhat narrow slot 15 therethrough, the ends of which in the full sized instrument terminate about three inches from the extreme ends thereof, at one end of which slot is a crescent 16 and at the other end a star 17. The opposing walls of the slot 15 for about one-half the length from the crescent extend on parallel curved lines 18—18 and thence on parallel straight lines 19—19 to the star, and furnish edges for accordingly directing a pencil for drawing the lines from the waist line to the shoulder for basques, coats, etc., and also for finding the correct line for the outer and inner seams of sleeves.

For locating a number of points from which to draw certain curved and straight lines there is applied to both surfaces adjacent the edges of the instrument in register with each other a number of symbols, i. e. at the curved end a "1st diamond" 20, and adjacent the straight edge a "2nd diamond" 21 located in the full sized instrument about six inches from the outer corner of the physically formed square, and in which corner there is a "3rd diamond" 22, each of the diamonds, 21 and 22, are provided with perforations 23, through which to project a lead pencil for circling the instrument for the drawing of curved lines for the waist and hip portion of the pattern. The location of other points being similarly indicated by an arrow 24, between the diamond 22 and the free end of the curved edge 8 and the letter O at 25, between the diamond 20 and the adjacent end of the straight edge 6, and as indicated at 26 by the numeral "6," and by V-shaped symbols 27 and 28, which on one surface of the instrument and as shown in Fig. 1 have indicated in connection therewith three radiating dotted lines, the first of which 29 is entitled "1st dotted line," the second 30, "2nd dotted line," and the third 31 as "3rd dotted line," the diverging ends of which intersect the curved edge 8 of the instrument appearing on both surfaces, reading from left to right in Fig. 1 Arm scye and neck curve, and in Fig. 2 Neck and arm scye curve, the side of the instrument on which the latter appears (see Fig. 2) having also imprinted thereon the script letter "E," the lower end of which intersects the curved edge 8 adjacent the other scye. The surface of the instrument shown in Fig. 2 also has imprinted thereon a line 34 marked "Diagonal line" intersecting the inner corner of the square and the end edge of the short arm 13 of the square, and which provides a means for locating the base line for the end of the sleeve.

The side of the instrument in Fig. 1 is provided with four sleeve scales 35, 36, 37 and 38, respectively marked " 1st sleeve scale "—" 2nd sleeve scale "—" 3rd sleeve scale " and " 4th sleeve scale," and of which the 1st, 2nd and 4th sleeve scales are perforated as indicated at 39, through which to project a lead pencil to indicate points from which to draw certain lines and curves hereinafter specifically referred to. Of these sleeve scales the 1st sleeve scale 35 extends at an oblique angle to the 3rd sleeve scale 37 which is located adjacent to and extends lengthwise of the adjacent wall of the slot 15, the 2nd sleeve scale 36 extending at a greater oblique angle thereto and in the opposite direction, the 4th sleeve scale 38 being on the opposite side of the slot and extending in a line parallel with the straight edge 6.

On the same side of the slot as the "1st, 2nd and 3rd sleeve scales" is a dart scale 40 marked "Scale XX waist sizes used in two dart waist" and adjacent the opposing edge wall of the slot is a short scale 41, and separated therefrom a longer and wider spaced scale 42, both of which are included under the one title "Scale XXX one dart waist."

Upon the edge of the elongated slot opposite the one dart waist scale 42 are two elbow scales, one of which 43 extends on a line parallel with the 3rd sleeve scale, and which is marked "Elbow scale (1)," and the other 44 marked "Elbow scale (2))." Located along the opposite edge of the slot, well toward the crescent mark therefor, is a waist scale 45 marked, "Scale X waist sizes" and parallel with the outer edge of the short arm of the square is a scale 46 marked "Neck sizes." It may here be observed that with the exception of the perforated first, second and fourth sleeve scales all other scales herein are indicated by straight lines. Another neck scale 47 is similarly located on the opposite side of the instrument (see Fig. 2) marked "2nd neck sizes," and on the same side of the instrument along the edge 12 and marked "Dart and hip curve" are two scales 48 and 49, one of which overlaps the other, respectively marked "Hand sizes (1)" and "Hand sizes (2)," and in this connection it is to be observed that on the opposite surface the same long curve is marked "Dart and shoulder curve," for the reason that this long curved edge provides a means for guiding a pencil in drawing not only a dart and shoulder curve, but certain hip curves, the edge 10 providing a means for guiding the pencil in drawing these several curves, and in some instances curves for other uses.

Parallel with and adjacent the straight edge, the surface of the instrument in Fig. 2 is provided with a scale 50 marked "1st neck sizes." In this connection it is now observed that with the exception of the scale 7 for the straight edge 6 and the inch scale on the arm 13 which forms the short arm of the square, and which latter scale is not at all actually necessary, all other scales are accurately calculated from and based upon every possible measurement of each and the several garments to which they are applicable, and for several of which their uses will presently be described, and their tests for accuracy given.

The drafting instrument herein shown and now described contains and embodies every scale, title, mark, indicated point, form of edge necessary for accurately drafting patterns from actual measurement, for every garment worn by women, and among others, two piece plain sleeves, one piece dress sleeves, leg o'mutton sleeves, shirt sleeves, coat sleeves, shirt waists, two dart waists, French basques, semi-fitting coats, box front with semi-fitting back and shawl collar, tight fitting coats, double breasted box coats, two piece skirts, gored skirts containing any number of gores from three to ten, circular skirts, bell skirts, tight fitting princess dresses, semi-fitting princess slips, stock collars, kimona waists, chemise, drawers, etc., on following printed instructions formulated respectively therefor accompanying the instrument.

The instrument illustrated in Figs. 1 and 2 is a proportionate reduction from the full sized instrument, the straight edge of which is provided with a twenty-inch scale, the total length of the instrument being twenty-three and one-half inches from end to end, and the other and transverse dimensions of which together the length and width of the slot may be readily ascertained by the use of the straight edge scale, as may also be the calculated scales for the various garments to which they are applied, although originally arrived at and tested from actual and differing measurements. With this understanding the application and use of the instrument for the drafting of patterns as to a few of these garments will now be accurately described, successively in connection with Figs. 3, 4, 5, 6 and 7 of the drawings.

Figure 3:
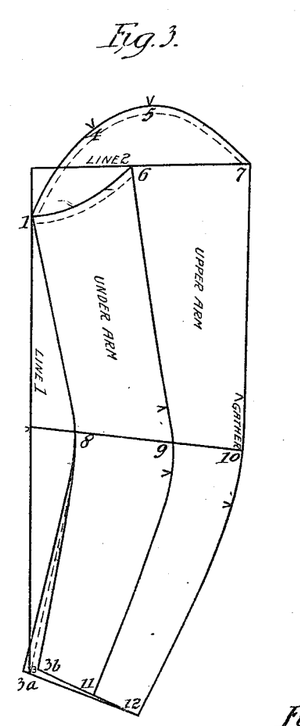
Fig. 3 is a diagram for directing the drafting of a pattern for a plain two-piece sleeve.

For drafting pattern for a plain two piece sleeve, and as is illustrated in Fig. 3 of the drawings, and assuming the actual measurements taken to be:

Length to elbow____________ 8¾"
Full length_______________ 18½"
Arm scye_________________ 14½"
Elbow size_______________ 11½"
Hand size________________ 8"

First draw line 1. From top of this line measure toward the right 6½ inches, mark (point 1). To the right of 1 measure the length to elbow, 8¾ inches, mark (point 2). Mark at full length of sleeve 18½ inches (point 3). At neck curve of rule, find "1st and 2nd dotted line." Place "1st dotted line" at point 1, have the V at opposite end directly on line 1. Find "1st and 2nd sleeve scale," mark in each the arm size 14 inches. Place finger on V at opposite end of "1st dotted line" hold firmly, while you move lower edge, "2nd dotted line" on line 1. Mark in "3rd and 4th sleeve scales," the arm size 14 inches. Remove rule, number the marks just made. The first (point 4), the second (point 5), the third (point 6), the fourth (point 7). Points 6 and 7 should be on a direct line with each other, therefore square on line 1; have straight edge at point 6, draw line as far as point 7, place 7 directly on this line. Draw the curves. Place neck curve of rule, the diamond at point 1, straight edge at point 6. Draw curve. Place the 18 inches straight-edge of rule at 1, the neck curve at 4. Draw curve. Place the 20 inches of rule at 4, the neck curve at 5. Draw curve. Reverse rule, place the 18 or 19 inches or nearly so, of rule at 7, the neck curve at 5. Draw curve. Reverse rule, place slot star end at point 2, have "3rd dotted line" directly on line 1. Mark at arrow (point 8) find "elbow scales (1) and (2)," mark in each the elbow size, 11 inches, (points 9 and 10). Draw elbow line from 2 to 10. Reverse rule, place "inner corner" at point 3, place the "diagonal line" leading from "inner corner" directly on line 1—find "hand sizes (1) and (2)"—mark in each the hand size, 8 inches (point 11 and 12). Draw line from 3 to 12. Reverse rule. Place slot crescent end at point 7, the same edge at point 10. Draw curve. Place slot crescent end at 6, the same edge at 9. Draw curve. Place neck curve, O of rule or nearly so, at point 8, straight-edge at point 1. Draw curve. Reverse rule. Place O, neck curve of rule, or the 20 inches at point 8, straight-edge at point 3. Draw curve. Use the same curve and straight edge at 9 to 11. Draw curve. Place the same curve and straight-edge at 10 to 12. Draw curve. Place outer corner of rule at point 3, have straight-edge on line 1, at ¼ inch toward you from 3 mark (point 3ᵃ). ¼ inch from you from 3 mark (point 3ᵇ). Draw new curve from 8 to 3ᵃ, also from 8 to 3ᵇ. Draw line from 3ᵃ to 12.

(Changing point 3 means simply that ¼ inch is taken off the under sleeve, and added to the upper sleeve, for causing the front seam to come well under.)

Figure 4:
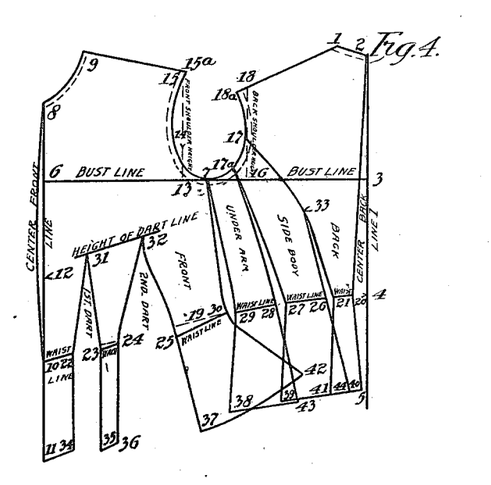
Fig. 4 is a diagram for a two-dart waist.

For drafting the pattern for a two-dart waist from measurements as follows:

| | | |
|---|---|---|
| Neck | 14 | inches |
| Neck height | 8 | " |
| Length of back | 15 | " |
| Bust | 39 | " |
| Length of front | 16 | " |
| Width of chest | 16 | " |
| Front shoulder height | 6½ | " |
| Width of back | 15 | " |
| Back shoulder height | 5½ | " |
| Length of shoulder | 8¼ | " |
| Under-arm | 8½ | " |
| Waist | 25 | " |
| Arm scye | 15 | " |

Draw line 1. At top of rule find "neck scale" mark at size of neck, 14 inches (point 1). On line 1, ⅜ of an inch to the left, mark (point 2). At 8 inches to the left of point 2—neck height—mark (point 3). Mark at length of back, 15 inches (point 4). At 6 inches—hip length—to the left of 4, mark (point 5). Square forward on line 1; from point 3 draw bust line to ½ inch more than half the bust measure, 20 inches, mark (point 6). Midway between 3 and 6, on bust line, mark (point 7). Reverse rule. Square on bust line to the left of 6. Draw line 2. Place 8 inches of rule—neck height—at 6, extend line 2 to the "1st neck sizes", mark at size of neck, 14 inches (point 8). At top of rule find "2nd neck sizes", mark at size of neck, 14 inches (point 9). From point 8, on line 2, measure to the left the length of front, 16 inches (point 10); extend this line 6 inches to the left of 10, mark (point 11). For height of dart, to the right of 10, mark at 6¾ inches (just below the fullest part of the bust), (point 12). Reverse rule. On bust line, at 1½ inches from you from 7, mark (point 13). At 2 inches to the right of point 6, on line 2, and toward you from that point, measure half the width of chest, 8 inches, or 16 half inches, mark (point 14). Square on bust line to the right of 13, mark at 6¾ inches—front shoulder height—(point 15). From point 3, measure from you, on bust line, mark at half the width of back, 7½ inches, or 15 in the ½ inches of rule (point 16). Square to the right of 16 on bust line; mark at 2½ inches (point 17); also mark at back shoulder height 5½ inches (point 18). Draw a line from 18 to 16. Measure from point 2, to 18, mark at length of shoulder, 8¼ inches (point 18ᵃ). Measure from 1 to 18ᵃ, make front shoulder from 9 to 15 measure ¼ of an inch less, mark (point 15ᵃ). Draw the curves. Place neck curve of rule, the arrow at 8, neck curve at 9. Draw curve. Place "inner corner" of rule at 15ᵃ, curved edge at 9. Draw curve. Place the same "inner corner" at 1, curved edge at 18ᵃ. Draw curve. Place neck curve of rule, the O at 1, the same curve at 2. Draw curve. Place arm curve of rule, the arrow, on bust line, at 7, or nearly so; the straight-edge at 18ᵃ. Draw curve. Reverse rule, place arm scye curve in position to touch 15ᵃ, 14, and the bust line. Draw curve. Turn the draft toward you. Reverse rule. Square on the bust line toward you from 7; mark at length of under-arm 8½ inches (point 19). At 1 inch to the left of 4, mark (point 20). Place slot crescent end at 20, the same curve at 19, draw the waist line. Find waist scale X mark in waist size, 25 inches (point 21). At ½ inch to the left of 21 mark (point 26). Place slot star end, at point 10, the same curve at 19, draw the waist line, on this line mark at arrow (point 22) . . . †.

Find the difference between the bust and waist; in this case 14 inches. Find scale XXX (one dart waist scale). There measure the space from 14 to 14, which is 4¾ inches. This is the amount to be taken up in darts. Divide the 4¾ inches into thirds; on the waist line to the right of 22, measure ⅓ of the 4¾ inches, which is 1⅝ inches, mark (point 23). Place slot, star end at 23, the same edge to touch the waist line; find scale XX, mark at waist size, 25 inches (point 24). From point 24 on the waist line measure the remaining ⅔ of dart, 3⅛ inches; mark (point 25). On tape, find ¼ the waist measure, 6¼ inches, from this subtract the space from 20 to 21, leaves 5 inches; divide this in two making 2½ inches each for the remaining two back forms. To the left of point 26, on the waist line, measure 2½ inches, mark (point 27), ½ inch to the left of 27, mark (point 28), from point 28 to the left, measure the other 2½ inches, mark (point 29). Again on tape find ¼ of the waist measure, 6¼ inches, subtract from this space from 10 to 22, and from 23 to 24, the remaining 3⅛ inches, measure to the right of 25, on waist line, mark (point 30).

To determine the height of darts, from point 12, draw a short line toward the right, slanting evenly with the waist line. Square toward you, on bust line; let straight edge pass midway between points 22 and 23, mark on height of dart-line (point 31). Square on bust line; let straight edge pass midway between 24 and 25, mark on height of dart line (point 32).

We will now draw the curves. Use dart or shoulder curve of rule. Place "inner corner" at 22, the curved edge to touch 31. Draw curve. Place the same curve and "inner corner" of rule at 24 to 32. Draw curve. For the back line of second dart, use arm scye curve, placing the O, or nearly so, at 32, the straight-edge at 25. Draw curve. Reverse rule, place "inner corner" at 23, curved edge at 31. Draw curve. Place the V, hip curve of rule at point 26, the curved edge to touch point 16; now mark at the figure 6—hip curve of rule—(point 33). In drawing the curves, use arm curve of rule, place O at 33, straight-edge at 21. Draw curve. Place a finger on rule at point 33; hold while you move straight-edge to point 26. Draw curve. Reverse rule. Place O or the figure 20 or 19, straight-edge of rule at 33; the same edge to touch 17. Draw curve. Place a finger on rule at point 33; On arm scye midway between 17 and 7, mark (point 17ª). Place "inner corner" of rule at 17ª, the curved edge at 27. Draw curve. Hold rule at 17ª, move lower edge to 28. Draw curve. Place the same "inner corner" of rule at 7, curved edge at 29. Draw curve. Reverse rule, place "inner corner" at 7, draw curve to point 30.

The back lines of the front darts usually fall short of measuring the same as their front lines; make them correspond by measuring from 22 to 31; from 31 to 23 should measure the same. Measure from 24 to 32, from 32 to 25 should measure the same. Draw a new waist line from the corrected mark 23 to 24, and from 25 to 30.

To now locate the hip points. Square on bust line, have straight-edge at point 22, draw a line toward you, from 22 mark at 6 inches (point 34). Square on bust line, have straight-edge at 23, draw a line toward you, from 23, mark at 6 inches (point 35). Square on bust line, have straight-edge at point 24, draw a line from 24 toward you, mark at 6 inches (point 36). Place outer corner of rule at 9 (at neck), have straight-edge at point 25; from 25, draw a line toward you, mark at 6 inches (point 37). Square toward you on bust line, have straight-edge to pass midway between 29 and 30, mark at 6 inches below the waist (point 38). Square toward you, on bust line; have straight-edge to pass midway between 27 and 28, mark at 6 inches below the waist (point 39). At ⅜ of an inch to the left of point 5, mark (point 40), measure the space from 20 to 21, 1¼ inches; measure the same amount to the left of 40, add ⅝ inch, part (point 41). Draw a line from point 2 to 20, from 20 to 40; also from 21 to 41. On tape, find ½ inch more than half the hip, 20 inches, place the 20 inches at point 40, subtract from it the space to 41; also from 36 to 35 and from 34 to 11, from the remaining 15½ inches, reserve 2¾ inches, this leaves 12¾ inches to be divided into thirds, 4¼ inches. To the right of 37, measure 4¼ inches, to this add the reserved 2¾ inches, mark (point 42). To the right of 38, measure ⅓ or 4¼ inches, mark (point 43). To the right of 39, measure the remaining ⅓, 4¼ inches, mark (point 44). Place V, hip curve of rule, at point 29, the figure 6 at 38. Draw curve. Place V at 27, the figure 6 at 39. Draw curve. Reverse rule, place V at 30, the figure 6 at 42. Draw curve. Place the V at 28, the figure 6 at 43. Draw curve. Place the V at 26, the figure at 44. Draw curve. For bust extension move point 12 to the left ⅜ of an inch. Place slot star end at 10, the same edge at point 12. Draw curve from 10 to 12; hold rule at 12, move crescent end to point 8. Draw curve from 12 to 8. This is center front.

Figure 5:
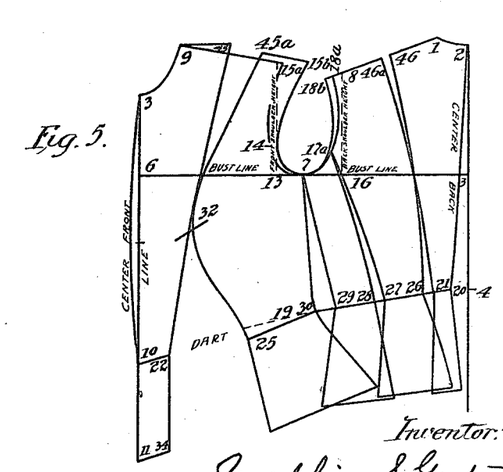
Fig. 5 is a diagram for a French basque.

*For drawing the pattern for a French basque.*—Make the two-dart waist (Fig. 4), as far as the dagger sign . . . †. Then return to the following instructions: Find the difference between the bust and the waist, in this case 14 inches. In scale XXX, on slot edge, find 14 in two places. The space between the two, 4¾ inches, is the amount to be taken up in a dart. The 14 toward the left place, at point 22, mark at the second 14 (point 25). On rule or tape find ¼ the waist, 6¼ inches. From this subtract the space from 20 to 21. Divide the remaining 5 inches into two, making 2½ inches each for the other two back forms. On the waist line to the left of 26, measure the 2½ inches, mark (point 27). One-half inch to the left of 27, mark (point 28). To the left of 28, measure the remaining 2½ inches, mark (point 29). Again, on rule, find ¼ the waist, 6¼ inches. Subtract from this the space from 22 to 10; the remaining 4¼ inches measure on the waist line, to the right of 25, mark (point 30). To determine the height of dart, from 12 toward the right draw a short line, slanting evenly with the waist line. On shoulder curve, midway between 9 and 15ª, mark (point 45). At 2 inches (to be taken up) to the right of 45, mark (point 45ª). For bust sizes under 37 inches make this dart 1½ inches or less. Add these two inches to the right of 15ª, mark (point 15ᵇ). Place slot star end at 22, the crescent end at 45. Draw curve. Where this curve crosses the "height of dart line," mark (point 32). At ¼ of an inch to the right of 32, place the "2nd dotted line," neck curve of rule, the straight-edge at 25. Draw curve from 25 through the height of dart to the lengthwise line, or line 22—45. The dart line must reach to the lengthwise line. (When the amount to be taken up in a dart is less than 5 inches, place the V, or "3rd dotted line," at 32, the straight-edge at 25. Draw curve). Reverse rule. Place neck curve, the O of rule on the lengthwise line at about one inch below the bust line, the straight-edge at 45ª. Draw curve. Draw a new shoulder and arm scye curve; fold line 45 to line 45ª; place "inner corner" of rule at 9, curved edge at 15ª. Draw curve. Place arm curve of rule, the arrow on bust line at 7, or nearly so, the straight-edge at 15ᵇ. Draw curve. (The object here is to add only the amount taken up in the dart at points 45 to 45ª, down to the bust line). On back shoulder line, midway between 1 and 18ª, mark (point 46). One-half inch (to be taken up) to the left of 46, mark (point 46ª). Add this ½ inch to the left of 18ª, mark (point 18ᵇ). Place slot star end at 21, the crescent end at 46. Draw curve. Place a finger on rule, where it crosses the bust line, hold while you move the slot to 46ª. Draw curve from 46 to the bust line. Hold rule at bust line, while you move slot at waist line to 26. Draw curve. Draw a new shoulder and arm scye curve. Reverse rule. Fold line 46 to line 46ª. Place "inner corner" of rule at 1, curved edge at 18ᵇ. Draw curve. Place neck curve, the arrow at 7, or nearly so, the straight-edge at 18ᵇ. Draw curve. On arm scye curve, midway between 17 and 7, mark (point 17ª). Place "inner corner" of rule at 17ª, curved edge at 27. Draw curve. Hold "inner corner" at 17ª, while you move curved edge to 28. Draw curve. Place "inner corner" at 7, the curved edge at 29. Draw curve. Reverse rule. Place "inner corner" at 7, curved edge at 30. Draw curve.

Locate the hip points. Square on bust line; have straight-edge to touch waist line at 22; draw a line toward you from 22; mark at 6 inches (point 34). Place outer corner of rule at 9 (neck); have straight-edge to touch waist line at 25, draw a line toward you from 25, mark at 6 inches (point 37). Measure the front dart line from 22 to 32, have the back line from 32 to 25, measure the same, mark. From this mark draw a new waist line to point 30. Square on bust line, have straight-edge to pass midway between 29 and 30. At 6 inches toward you from the waist line, mark (point 38). Square on bust line, have straight-edge to pass midway between 27 and 28, at 6 inches toward you from the waist line, mark (point 39). Three-eighths of an inch to the left of 5, mark (point 40). Measure the space from 20 to 21, measure the same amount to the left of 40, add ⅜ inch, mark (point 41). Draw center back line, from 2 to 20, and from 20 to 40; also draw a line from 21 to 41. On tape find ½ inch more than half the hip, 20 inches (39 hip); place the 20 inches at point 40, subtract from it the space to 41; also subtract the space from 34 to 11 from the remaining 16½ inches, reserve 2¾ inches, this leaves 13¾ inches to be divided into thirds, 4⅝ inches. To the right of 37, measure 4⅝ inches, to this add the reserved 2¾ inches, mark (point 42). To the right of 38, measure ⅓, or 4⅝ inches, mark (point 43). To the right of 39, measure ⅓, or 4⅝ inches, mark (point 44). Draw curves. Place hip curve of rule, the V at 29, the figure 6 at 38. Draw curve. Place the same curve, V at 27, the figure 6 at 39. Draw curve. Reverse rule. Place the same curve, V at 30, the figure 6 at 42. Draw curve. Place the V at 28, the figure 6 at 43. Draw curve. Place the V at 26, the figure 6 at 44. Draw curve. For bust extension, move point 12 to the left ⅜ of an inch. Place slot star end at 10, the same edge at 12. Draw curve. Hold slot edge at 12; move crescent end to 8. Draw curve. This is center front.

Figure 6:
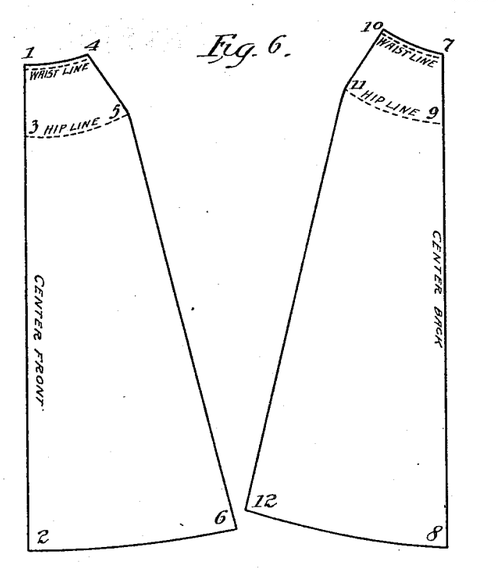
Fig. 6 is a diagram for a two piece skirt.

*A two piece skirt. (Also foundation for fancy skirts.)*—

MEASURES.

| | |
|---|---|
| Waist | 25 inches. |
| Hip | 40 " |
| Front length | 40 " |
| Side length | 41 " |
| Back length | 42 " |

From (point 1) draw center front line to length of skirt wanted, 40 inches, mark (point 2.) On this line place the straight-edge of rule, have "2nd diamond" at point 1, mark at "3rd diamond" (point 3). Place a finger at "2nd dotted line," hold, while with pencil in "2nd diamond" circle from you to about ten inches. This is the waist line. Do not remove finger, hold and replace straight-edge of rule to center front line. Place pencil at "3rd diamond," circle from you to about twelve inches. This is the hip line. Measure from point 1 on waist line to one-fourth the waist measure, 6¼ inches, mark (point 4). From point 3 measure on hip line to one-fourth the hip measure, 10 inches, mark (point 5). From point 2 measure from you to one-fourth the desired width of skirt at bottom in this case 18 inches, (two yards all around) mark (point 6). Measure from point 4 through 5 to side length of skirt 41 inches. Place point 6 at this mark. Draw line from 5 to 6. Place hip curve of rule, the V at point 4, the figure 6 at point 5. Draw curves; draw slightly curved line from point 2 to 6. This completes the first gore.

Second gore: Reverse rule. From point 7 draw center back line, mark at 42 inches—back length—(point 8). Place "2nd diamond" at point 7, have rule straight with center back line. Mark at "3rd diamond" (point 9). Place finger on the 18¼ inches of rule, hold while with pencil in "2nd diamond" circle toward you to about ten inches. This is the waist line. Do not remove finger, hold and replace rule to center back line. With pencil at point 9 in "3rd diamond" circle toward you about twelve inches. This is hip line. With tape, measure toward you on waist line to one-fourth the waist measure, 6¼ inches, mark (point 10). Measure toward you from point 9, on hip line to one-fourth the hip measure, 10 inches, mark (point 11). From point 8 measure toward you one-fourth the width of skirt wanted, 18 inches, mark (point 12). Measure from point 10 through 11 to side length of skirt, 41 inches, place point 12 at this mark. Draw line from 11 to 12. Place hip curve of rule the V at point 10, the figure 6 at 11. Draw curve. Draw slightly curved line from 8 to 12. This completes the second gore.

Figure 7:
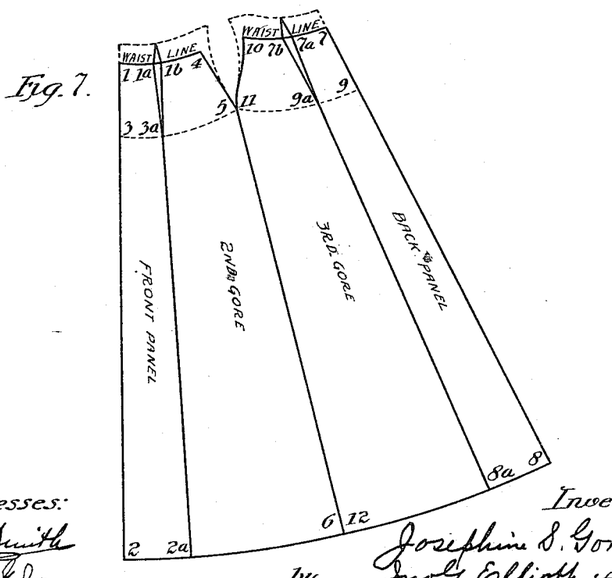
Fig. 7 is a diagram for a six gore skirt, from which to draft patterns respectively therefor following the printed instructions above referred to and hereinafter set forth.

*The six gore skirt.*—First make the two piece skirt (Fig. 6). We will now divide it into six gores. Measure from point 3 on the hip line, the desired width for front panel, in this case 3½ inches, mark (point 3$^a$). From point 2 measure from you 1½ inches, less than double the amount from 3 to 3$^a$, which is 5½ inches, mark (point 2$^a$). Draw line from 2$^a$ through 3$^a$, to the waist line, mark (point 1$^a$).

Remarks: When the difference between the waist and the hip is 12 inches and over, place ¼ to ¾ of an inch dart between front panel and second gore, the same between the back panel, and the third gore. When the difference is less than 12 inches no dart is required at these points.

From you, from point 1$^a$ measure ⅝ of an inch for a dart — mark (point 1$^b$). Move point 4 from you, the same amount, ⅝ of an inch. Re-draw dart line from this point down to 5. Draw dart line from 3$^a$ to 1$^b$.

Back gore: The back panel is made exactly like the front panel. At 3½ inches toward you from 9, mark (point 9$^a$). Measure toward you from point 8, 1½ inches less than double the amount from 9 to 9$^a$, 5½ inches, mark (point 8$^a$). Draw line from 8$^a$ through 9$^a$ to the waist line, mark (point 7$^a$) ⅝ of an inch—for a dart—toward you from 7$^a$, mark (point 7$^b$). Draw dart line from 9$^a$ to 7$^b$. Move point 10 toward you ⅝ of an inch—the amount of dart taken up—and re-draw hip line from that point down to 11. The dotted lines above the waist line indicate a 1½ inch raised waist line.

Try this skirt to the following measures.

Waist ______________ 31 inches.
Hip ________________ 45 "
Length of skirt ______ 42 "

*The seven gore skirt.*—First make the six gore skirt; now add a plait in back. Mark at 3 inches from you from 7, and at 3½ inches from you from 9. Draw line from the first mark through the second to the length of skirt wanted. Fold center back line 7, 9 and 8, place it on the line just drawn making the inverted plait. For slight flare move point 8$^a$ toward you 1½ inches, draw line from there to point 9$^a$. Use this line for the side seam of back gore. Use the panel line however for the side seam of the third gore.

*The five gore skirt.*—To make this skirt use the seven gore pattern. Dispense with the hip seam by placing second and third gores together at points 5 and 11, and 6 and 12. There will be a dart from the hip to the waist. The front panel will be separate, also the back gore, an inverted plait may be added to the center back. For this plait see instructions for seven gore skirt.

*The three gore skirt.*—Use the seven gore pattern. Place the edges of the second, third and back gores together from the hip points down. Cut in one gore. The front panel will be separate. This skirt will have from one to two darts from waist line to hip.

With the drafting of the foregoing patterns following these instructions, it will now be understood that the first dotted line 29 is for locating two points of the top of a sleeve, the second dotted line 30 for locating two other points for the top of a sleeve, the third dotted line for locating three elbow points for getting the proper width of both a one and two piece sleeve, and the diamond 20 for locating and drawing the curve for the under-arm of any sleeve; that the arrow 24 is for locating the neck curves for the front of a waist and the slot for drawing the lines straight and curved from the front and back of a waist to the shoulders; the symbol 6 for indicating that the hip curve is to be located six inches below the waist line and for drafting the line therefor; that of the neck scales, one is for the back and two for the front of the neck; and that the diagonal line 34 is for obtaining the proper slant for the end of sleeves.

A drafting instrument when shaped and slotted to form the straight and curved edges and in the arrangement herein described, necessitates the use of but fourteen calculated scales, of which only three need be perforated. No curved lines are or need be imprinted thereon; and not more than twenty-five printed pages of instructions need be used for teaching its use in accurately drafting from measurements every garment before enumerated, worn by women. On the other hand one piece drafting instruments as constructed before my invention, require for the drafting of patterns for the same garments thirty-two calculated scales, of which seventeen are perforated, and numerous imprinted lines both curved and straight, and about seventy-five pages of printed instructions for teaching and learning their use. In this connection it is proper to observe that of the calculated scales heretofore employed in one piece drafting instruments, their shoulder scale, bust scale, hip scale (which does not always prove up to be correct), skirt scales, each for five, seven and eleven gores, one of three waist scales, the presence of which frequently varies the width of the two side forms, five sleeve scales, one of which confuses the use of the other four, and their imprinted continuous line, selectively used curves for the hips and shoulders, curved line for the neck and arm scye curves, lines for the front and back shoulder curves, and lines for finding the back and front neck lines are omitted from the instrument of my invention, because from many years of practice and experience in teaching numerous pupils they are not only useless, but confusing to the pupil, and difficult of explanation by expert teachers. In other words from prolonged practice and teaching, it is found that with the substitution of a tape measure for a calculated shoulder scale, bust scale, hip scale, skirt scale, of a tangible edge for imprinted lines for drafting the front and back shoulder curves, for hip curve, curved lines for the neck and arm scye curves, and the use of distinct and separated edges for drawing the hip and shoulder curves instead of as heretofore, a continuous line, the curves of which are to be selectively used for the hip and shoulder curves, and additionally providing the instrument with a raised waist line curve, the time and skill necessary for pupils to become expert in the use of a one piece instrument for drafting from measurement the patterns for the various garments before enumerated, is not only substantially and materially reduced, but to a minimum. My invention therefore finds its embodiment in a one piece drafting instrument of the type and types herein referred to, provided with curved and straight edges, the numbers and relative arrangements of which are such that the fewest possible number of both imperforate and perforate calculated scales may be used for accurately drafting from measurement every and the various patterns for which one instrument has heretofore been designed and intended, and whereby the drafting of such patterns may be easiest taught and learned in the shortest possible time, and be self taught by students of ordinary intelligence, as has not heretofore been possible. In this connection it is proper to state that I believe myself to be the first to provide a one piece instrument having curved and straight edges and scales in sufficient number for drafting the patterns for the numerous garments herein specified, with an arm projecting at a right angle thereto for and adapted to produce the short arm of a square, the outer edge of the long arm of which is formed by the longitudinal straight edge of the instrument; or wherein the inner corner of a square is formed by a curved edge bisecting the inner longitudinal edge of an arm extending at a right angle to a straight edge; or wherein curved and straight edges are provided through the medium of a slot extending lengthwise of an instrument, one edge of which provides a straight edge merging into a curved edge extending across the end of an instrument.

Having described my invention, what I claim and desire to secure by Letters Patent is:

1. A device for the purpose described consisting of a flat instrument provided longitudinally with a straight edge, merging into a convexly curved edge extending across the end of the instrument, and intersecting an opposing concave curved edge, which said curved edges are adapted for drafting the line for both an arm scye and neck curve.

2. A device for the purpose described consisting of a flat instrument provided longitudinally with a straight edge merging into a convexly curved end of constantly decreasing radius, said curve intersecting a concave curved edge.

3. A device for the purpose described consisting of a flat instrument provided with a straight edge, merging into a convexly curved edge extending across the end of the instrument, and adapted for drafting both an arm scye and neck curve, and with an elongated slot extending lengthwise of and for a portion of its length parallel with the straight edge, adapted for locating the points for and drafting two back lines of a sleeve.

4. A device for the purpose described consisting of a flat instrument provided with a straight edge merging into a convexly curved edge extending across the end of the instrument, and with an elongated concave curved edge approximately parallel with the straight edge adapted for drafting both the dart and shoulder curves of a garment.

5. A device for the purpose described, consisting of a flat instrument provided with a straight edge terminating in a curved edge, extending across the adjacent end of the instrument, merging into a convexly curved edge terminating in an outwardly curved edge generally extending at an oblique angle to the straight edge and connected by a sharp curve, with an elongated curved edge extending on a line approximately parallel with the straight edge.

6. A device for the purpose described consisting of a flat instrument provided with a straight edge merging at one end into a curved edge extending across one end of the instrument, and at its opposite end intersecting an edge extending at a right angle thereto, which, together with the straight edge forms the two outer edges of a square.

7. A device for the purpose described, consisting of a flat instrument, one longitudinal edge of which provides a straight edge, and the other side an elongated curved edge, and with an arm, the opposing longitudinal edges of which extend at a right angle to the straight edge, the inner edge of which arm intersects said curved edge, and with said curved edge provides the inner corner of a squaring instrument.

In witness whereof, I have hereunto set my hand and affixed my seal, this 25th day of March, A. D. 1916.

JOSEPHINE S. GORTON. [L. S.]

Witnesses:
MILDRED ELSNER,
JNO. G. ELLIOTT.

Copies of this patent may be obtained for five cents each, by addressing the "Commissioner of Patents Washington, D. C."